(No Model.)

W. BRAMWELL.
CUTTER HEAD FOR BORING MACHINES.

No. 276,760. Patented May 1, 1883.

Witnesses
J. Staib
Chas. H. Smith

Inventor:
William Bramwell
per Lemuel W. Serrell atty.

N. PETERS. Photo-Lithographer, Washington, D. C.

UNITED STATES PATENT OFFICE.

WILLIAM BRAMWELL, OF TOLEDO, OHIO.

CUTTER-HEAD FOR BORING-MACHINES.

SPECIFICATION forming part of Letters Patent No. 276,760, dated May 1, 1883.

Application filed June 19, 1882. (No model.)

*To all whom it may concern:*

Be it known that I, WILLIAM BRAMWELL, of Toledo, in the State of Ohio, have invented an Improvement in Cutter-Heads for Boring-Machines, of which the following is a specification.

This invention relates to the head for holding the cutters in boring-machines; and it consists in a stock grooved at an inclination to the axis, into which grooves the cutters are received, in combination with a clamping-ring to secure the cutters firmly in place, and a nut by which such cutters are supported at their ends and moved to adjust them for boring the required size of hole. These cutters and heads are adapted to boring holes in metal, surfacing the metal around a rivet or bolt hole, or performing other machine-boring.

Figure 1:
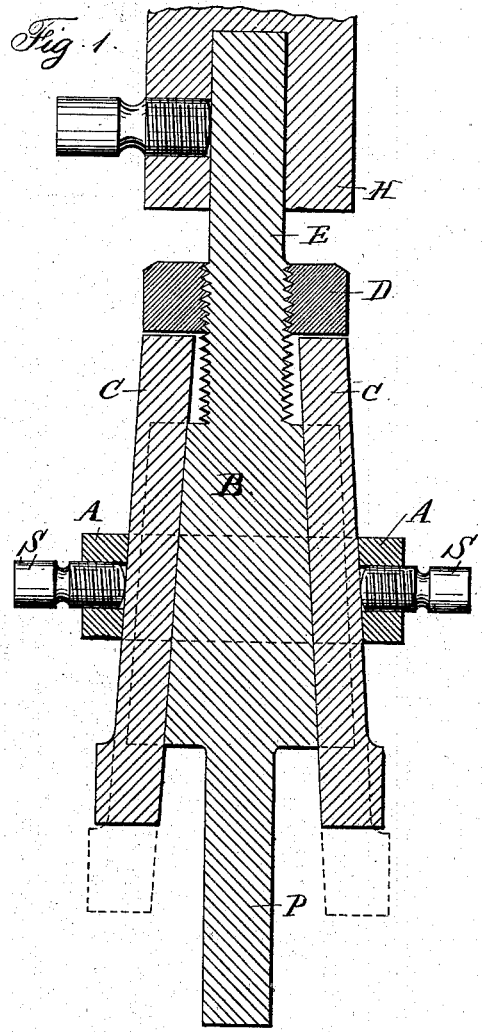
Figure 2:
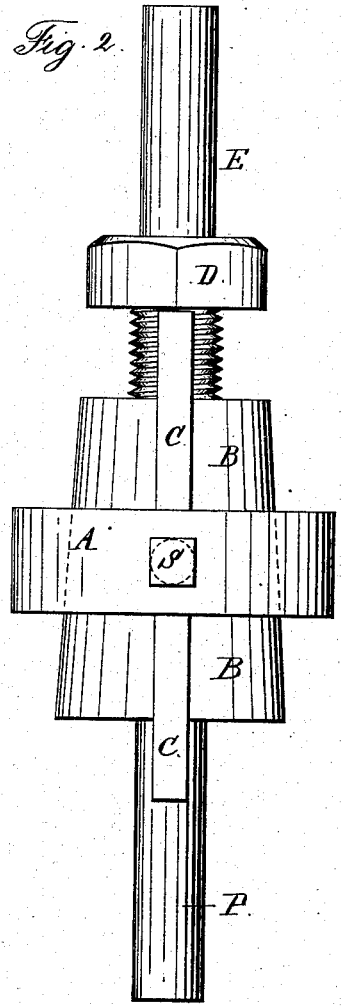
Figure 3:
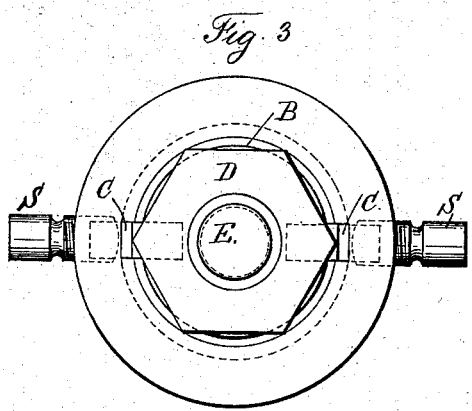

In the drawings, Figure 1 is a vertical section, Fig. 2 is an elevation, and Fig. 3 is a plan, of the cutter-head and cutters.

The stock B is of any convenient shape, and it is provided with a stem, E, that is adapted to being passed into the revolving cutter-bar H or mandrel of the boring-machine, and around this stem there is a screw-thread and a nut, D. In the surface of the cutter head or stock there are grooves for the reception of the cutters C C. These grooves diverge, and are at an inclination to the axis of the cutter-head, and there is a collar, A, around the stock and outside the cutters C, with set-screws S to clamp the cutters firmly into the grooves of the stock. By adjusting the nut D the cutters will be moved endwise in the inclined grooves, and thereby be adjusted with great accuracy to bore or cut larger or smaller holes. The cutters can be easily removed for grinding and for the insertion of other cutters, as required. There is a guide-pin, P, projecting from the cutter-stock, and adapted to pass into a bushing secured to the table of the boring-machine to steady the cutter-head as it is revolved.

It is to be understood that if the lower or cutting ends of the cutters wear away in use, so as not to cut or bore a hole of the required size, the endwise movement given by the nut to the diverging cutters will spread them to the proper extent. But one cutter may be used; but I prefer two or three placed at equal distances apart.

I claim as my invention—

The combination, with the boring-head having one or more grooves at an inclination to the axis, of a cutter in such groove, a ring and clamp screw to hold the same, and a nut around the screw-stem, acting against the end of the cutter to adjust the same, substantially as set forth.

Signed by me this 8th day of June, A. D. 1882.

WM. BRAMWELL.

Witnesses:
WM. JOHNS, Jr.,
D. E. MERRILL.